US012054242B2

(12) United States Patent
Brun et al.

(10) Patent No.: US 12,054,242 B2
(45) Date of Patent: Aug. 6, 2024

(54) WHEEL BRAKING DEVICE

(71) Applicant: SAFRAN LANDING SYSTEMS, Velizy Villacoublay (FR)

(72) Inventors: Emmanuel Brun, Moissy-Cramayel (FR); Vincent Pavoine, Moissy-Cramayel (FR); David Frank, Moissy-Cramayel (FR); Jean-Baptiste Lestage, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 265 days.

(21) Appl. No.: 17/630,793

(22) PCT Filed: Jul. 29, 2020

(86) PCT No.: PCT/EP2020/071450
§ 371 (c)(1),
(2) Date: Jan. 27, 2022

(87) PCT Pub. No.: WO2021/018988
PCT Pub. Date: Feb. 4, 2021

(65) Prior Publication Data
US 2022/0266990 A1 Aug. 25, 2022

(30) Foreign Application Priority Data
Jul. 30, 2019 (FR) ...................................... 1908705

(51) Int. Cl.
*B60T 8/32* (2006.01)
*B64C 25/44* (2006.01)
*B64C 25/46* (2006.01)

(52) U.S. Cl.
CPC .............. *B64C 25/44* (2013.01); *B60T 8/325* (2013.01); *B64C 25/46* (2013.01)

(58) Field of Classification Search
CPC .......... B60T 8/325; B64C 25/44; B64C 25/46
(Continued)

(56) References Cited

U.S. PATENT DOCUMENTS 5,390,990 A * 2/1995 Cook ...................... B60T 8/885
303/7
6,036,285 A * 3/2000 Murphy .............. B60T 8/17616
303/112

(Continued)

FOREIGN PATENT DOCUMENTS

EP 1712441 A1 10/2006
EP 2727784 A1 5/2014

OTHER PUBLICATIONS

International Search Report of PCT/EP2020/071450 dated Oct. 7, 2020 [PCT/ISA/210].

*Primary Examiner* — Erick R Solis
(74) *Attorney, Agent, or Firm* — Sughrue Mion, PLLC

(57) ABSTRACT

The invention relates to a device for braking a wheel, the device comprising:
- a brake including at least a first actuator and a second actuator arranged to apply a braking torque to the wheel;
- a control system arranged to control the first and second actuators individually as a function of a required braking value; and
- at least a first breaking torque sensor arranged to supply the control unit with a first measurement of the braking torque applied to the wheel by the brake.

According to the invention, the control system is arranged to interrupt control of the first actuator or control of the second actuator in the event of the braking torque measured by the first sensor exceeding a predetermined braking torque limit.

13 Claims, 3 Drawing Sheets

(58) Field of Classification Search
USPC .......... 244/110 H, 111; 303/112; 701/70, 71, 701/76, 78, 80
See application file for complete search history.

(56) References Cited

U.S. PATENT DOCUMENTS

| | | | |
|---|---|---|---|
| 6,402,259 B2* | 6/2002 | Corio | B64C 25/42 |
| | | | 701/76 |
| 6,890,041 B1 | 5/2005 | Ribbens et al. | |
| 10,081,346 B2 | 9/2018 | Romana et al. | |
| 2002/0026273 A1* | 2/2002 | Tamura | B60T 13/662 |
| | | | 701/96 |
| 2003/0020326 A1* | 1/2003 | Salamat | B60T 8/17616 |
| | | | 303/112 |
| 2003/0025035 A1* | 2/2003 | Park | B64C 25/46 |
| | | | 244/111 |
| 2004/0054450 A1* | 3/2004 | Nakamura | B60T 8/00 |
| | | | 701/22 |
| 2005/0001474 A1* | 1/2005 | Zierolf | B60T 8/325 |
| | | | 303/112 |
| 2006/0108864 A1 | 5/2006 | Evans et al. | |
| 2011/0226569 A1 | 9/2011 | Devlieg | |
| 2018/0079402 A1 | 3/2018 | Bruggemann et al. | |
| 2018/0370504 A1* | 12/2018 | Bill | B64C 25/44 |
| 2022/0364620 A1* | 11/2022 | Solari | F16D 65/08 |

* cited by examiner

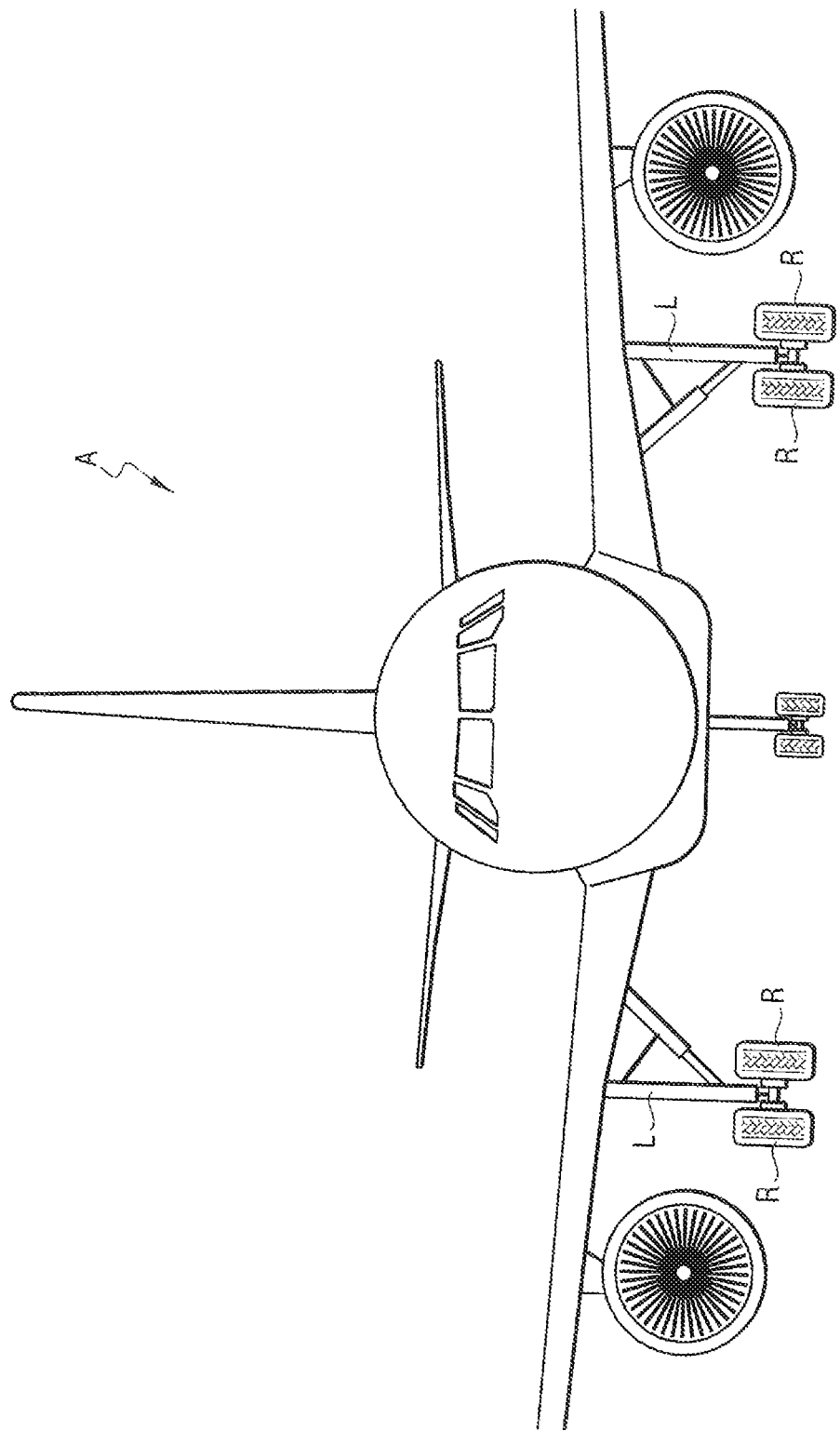

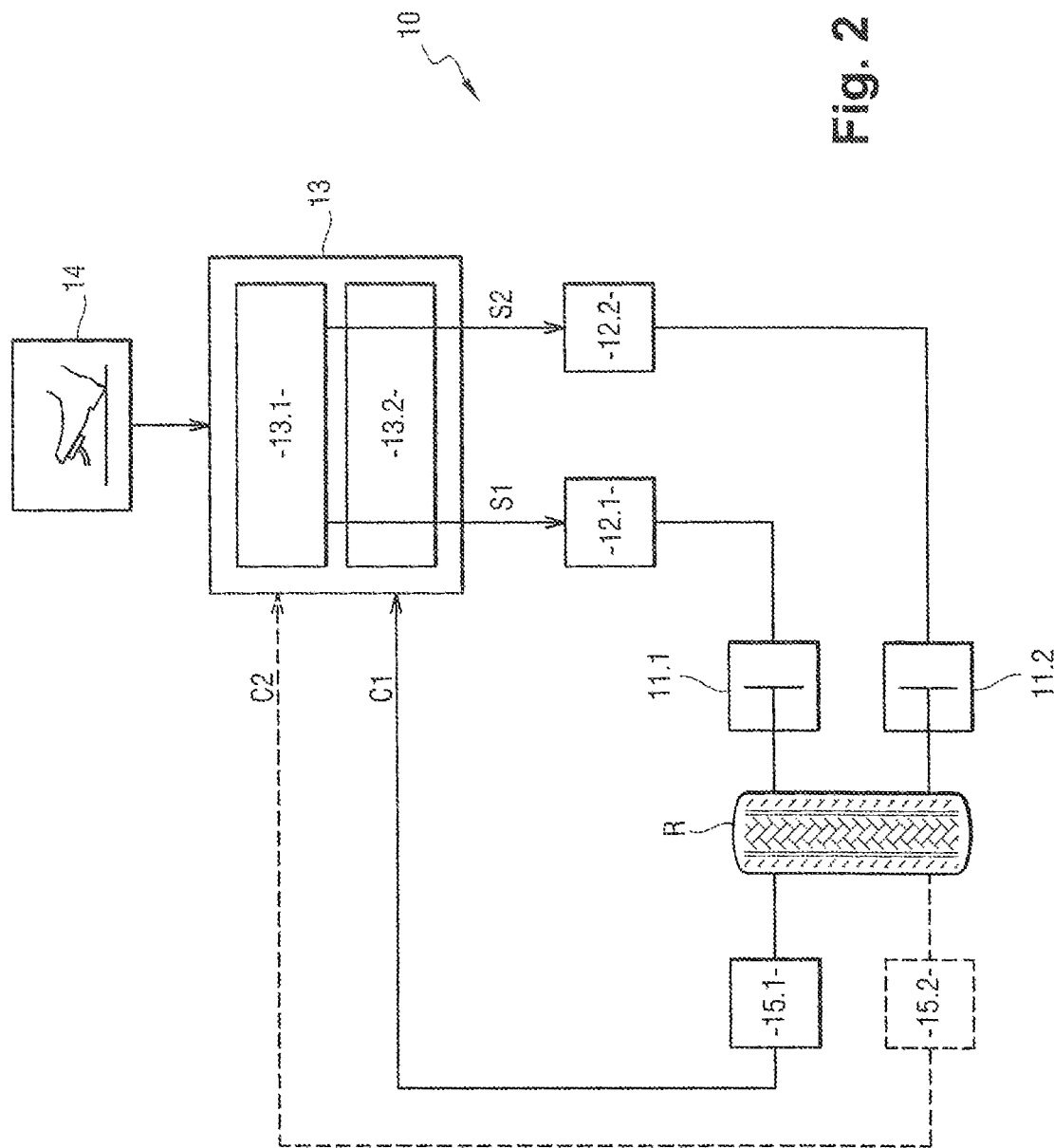

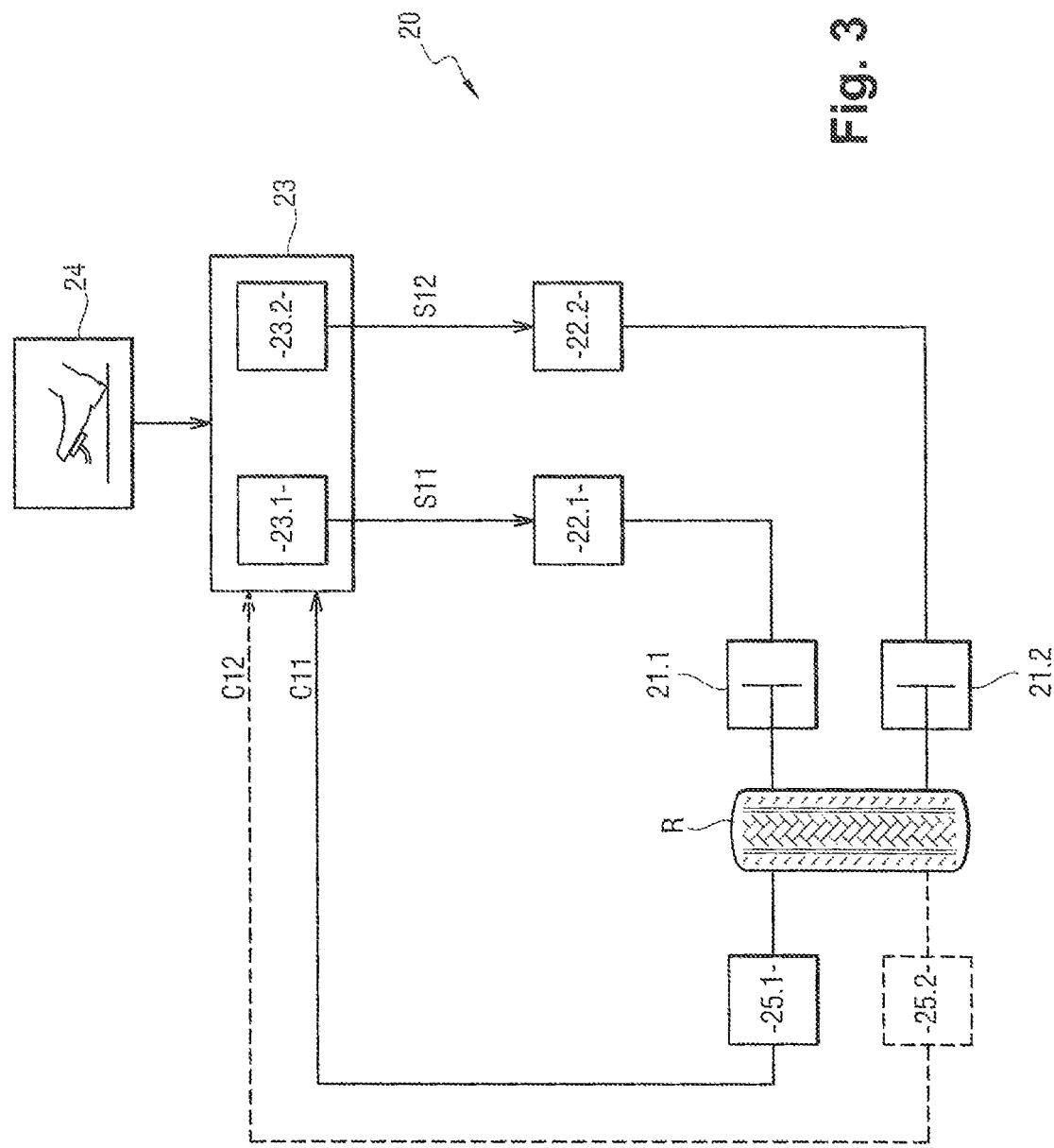

WHEEL BRAKING DEVICE

CROSS REFERENCE TO RELATED APPLICATIONS

This application is a National Stage of International Application No. PCT/EP2020/071450 filed on Jul. 29, 2020, claiming priority based on French Patent Application No. 19 08705 filed on Jul. 30, 2019, the entire contents of each of which being herein incorporate by reference in their entireties.

The present invention relates to the field of braking, and more particularly, to a device for braking a wheel of a vehicle. The invention applies in particular to braking the wheels of aircraft landing gear.

BACKGROUND OF THE INVENTION

In order to slow down a vehicle, stop it, or keep it stationary, it is common practice to apply pressure on a brake pedal in order to cause a braking system to operate. The braking system generally comprises brakes mounted on wheels of the vehicle and making use of the principle of friction between two surfaces that are put into contact under the action of a pressing force.

For given the depression or turning of the pedal, the pressing force is generally initially identical on each of the brakes of the vehicle, and it is subsequently regulated independently of each brake in order to generate optimum braking torque on each of the wheels without locking them.

Such braking systems are reliable and effective, but they present the drawback of leading to great disparities between the braking torque produced and the pressing force being applied to each of the wheels, in particular between the beginning and the end of a braking operation, between a new brake and a worn brake, between one brake and another, . . . .

It is also recognized that this type of braking system is much more effective at low speeds than at high speeds, even though it is at high speeds that braking performance is the most critical. The low-speed response of the braking system thus appears to be disproportionate and gives rise to large stresses that require the structure carrying the brake to be over-sized.

However, lightening aircraft has become an inescapable objective for all aircraft manufacturers, in particular in order to reduce the fuel consumption of aircraft. Specifically, environmental standards require a reduction in polluting emissions, in particular of carbon dioxide ($CO_2$).

Very effective braking devices are disclosed in Documents FR-A-3 044 432 and FR-A-3 044 296.

OBJECT OF THE INVENTION

An object of the invention is to propose a braking system that is simple, while being robust and reliable, and that enables the above-specified drawbacks to be obviated, at least in part.

SUMMARY OF THE INVENTION

To this end, the invention provides a braking device for braking a wheel, the device comprising:
- a brake including at least a first actuator and a second actuator arranged to apply a braking torque to the wheel;
- a control system arranged to control the first and second actuators individually as a function of a required braking value; and
- at least a first braking torque sensor arranged to supply the control unit with a first measurement of the braking torque applied to the wheel by the brake.

According to the invention, the control system is arranged to interrupt control of the first actuator or control of the second actuator in the event of the braking torque measured by the first sensor exceeding a predetermined braking torque limit.

Such a braking device makes it possible, in simple manner, to provide protection against excessive braking torque, e.g. as might be due to a malfunction of one of the actuators.

In a first embodiment, the control system comprises an electronic control unit arranged to deliver a first control signal to the first actuator and a second control signal to the second actuator. An electronic monitoring unit is arranged, when the braking torque measured by the first sensor exceeds the predetermined braking torque limit value, to prevent the first control signal or the second control signal from being delivered.

The monitoring unit is thus capable of limiting the braking torque that is actually applied to the wheel. This arrangement is particularly advantageous, since it makes it possible to limit the influence of a failure of the control unit (e.g. due to an error in a computer program that determines the control signals).

In a second embodiment, the control system comprises a first individual control unit arranged to deliver a first control signal to the first actuator and a second individual control unit arranged to deliver a second control signal to the second actuator.

Such an arrangement enables the control system to limit the braking torque applied by the brake of the wheel by interrupting control of the first actuator or of the second actuator depending on whether it is the first control unit or the second control unit that has failed. Each individual electronic control unit can release the force produced by the actuator under its control very quickly in the event of excess torque, e.g. resulting from a failure of the other control unit, thereby limiting the excess torque exerted by the braking device as a whole.

In particular manner, the control system includes a servo control loop for controlling the first actuator and the second actuator in application of a control relationship that is a function both of the required braking value and also of the braking torque measured by the first sensor.

The servo control loop can thus enable the braking torque applied by the brake on the wheel to be controlled finely, and thus in particular to ensure that the energy that is dissipated while braking is better distributed among the various wheels of a vehicle provided with such a braking device.

In particular manner, the braking value is representative of the amplitude of a movement of a braking control instrument, e.g. such as a movement of a brake pedal.

In particular manner, the first actuator and the second actuator are electromechanical.

In a variant, the first actuator and the second actuator are hydraulic actuators.

In particular manner, a second torque sensor is arranged to supply the control system with a second measurement of the braking torque applied by the brake to the wheel.

The use of two braking torque sensors serves to make the device more reliable by duplicating the measurements of the braking torque that is applied to the wheel.

Under such circumstances, advantageously, the first braking torque sensor and the second braking torque sensor are of different technologies.

This limits the risk of both braking torque sensors being sensitive to the same disturbances or being subjected to failures of the same type, such that the probability of both braking torque sensors failing at the same time is low. This improves the safety of the braking device of the invention.

The invention also provides landing gear including at least one wheel provided with such a braking device.

The invention also provides an aircraft including such landing gear, and more particularly an airliner.

BRIEF DESCRIPTION OF THE DRAWINGS

The invention can be better understood in the light of the following description, which is purely illustrative and non-limiting, and which should be read with reference to the accompanying drawings, in which:

FIG. 1 is a simplified diagram of an aircraft having landing gear with wheels that are provided with braking devices of the invention;

FIG. 2 is a block diagram of a braking device in a first embodiment of the invention; and FIG. 3 is a block diagram of a braking device in a second embodiment of the invention.

DETAILED DESCRIPTION OF THE INVENTION

As shown in FIG. 1, an aircraft A has two main undercarriages L, each carrying wheels R that are said to be "braked", i.e. that are fitted with respective brakes for braking the aircraft A when it is on the ground. The present description relates to a single braked wheel R, but the invention naturally applies in the same manner to all or some of the braked wheels R of the aircraft A.

With reference to FIG. 2, and in a first embodiment of the invention, a braking device 10 for braking the wheel R comprises a brake for braking the aircraft A. In known manner, the brake comprises at least a first actuator 11.1 and a second actuator 11.2 arranged to press on a stack of brake disks so as to exert braking torque on the wheel R, and thereby slow down rotation of the wheel. In this example, the first actuator 11.1 and the second actuator 11.2 are hydraulic actuators of capacities that are equivalent. The maximum braking torque is obtained when the first actuator 11.1 and the second actuator 11.2 are both acting simultaneously on the brake disks to exert the maximum pressing force that each of them is capable of producing.

The first actuator 11.1 is connected to an output of a first hydraulic servovalve 12.1 and the second actuator 11.2 is connected to an output of a second hydraulic servovalve 12.2. The first servovalve 12.1 and the second servovalve 12.2 deliver fluid under pressure coming from a hydraulic unit respectively to the first actuator 11.1 and to the second actuator 11.2, thereby enabling the respective positions of the first actuator 11.1 and of the second actuator 11.2 to be controlled.

The first and second servovalves 12.1 and 12.2 are connected to a control system 13. In conventional manner, the control system 13 comprises an electronic control unit 13.1 arranged to deliver a first control signal S1 and a second control signal S2 respectively to the first servovalve 12.1 and to the second servovalve 12.2. The electronic control unit 13.1 is arranged to prepare the first signal S1 and the second signal S2 as a function the pilot of the aircraft depressing a brake pedal 14, and to do so in such a manner that the first signal S1 and the second signal S2 are representative of the depression of the brake pedal 14. To do this, the control unit 13.1 contains in memory one or more control relationships associating the signals S1 and S2 with the depression of the brake pedal.

The control system 13 is connected to a first braking torque sensor 15.1 and it includes an electronic monitoring unit 13.2 arranged to take a first measurement C1 supplied by the first sensor 15.1 and to compare it continuously with a predetermined braking torque limit value. When the electronic monitoring unit 13.2 detects that the first measurement C1 supplied by the first sensor 15.1 exceeds the predetermined braking torque limit value, the electronic monitoring unit 13.2 is arranged to block the delivery of the first control signal S1 to the first servovalve 12.1 or of the second control signal S2 to the second servovalve 12.2.

Thus, the electronic monitoring unit 13.2 can interrupt any inappropriate control of the first actuator 11.1 or of the second actuator 11.2, and thus provide protection against any excess torque, in particular as might be due to a failure of the electronic control unit 13.1.

Optionally, the control system 13 may be connected to a second braking torque sensor 15.2 that, in similar manner to the first sensor 15.1, is arranged on the brake so as to supply the control system 13 with a second measurement C2 of the braking torque applied by the brake on the wheel R. Adding the second sensor 15.2 serves to guarantee better availability of the braking torque measurement to the electronic monitoring unit 13.2, in particular in the event of the first sensor 15.1 malfunctioning. Adding the second sensor 15.2 also serves to guarantee better reliability for the system by making it possible to detect drift in one of the sensors.

Advantageously, the first and second sensors 15.1 and 15.2 are dissimilar, i.e. they are of technologies that are different, so that they are not sensitive to the same disturbances and not subject to failures of the same types. It is advantageous to arrange for the electronic monitoring unit 13.2 to monitor the sensors 15.1 and 15.2, and optionally to determine which of the first and second sensors 15.1 and 15.2 is supplying an erroneous measurement of the braking torque. By way of example, the method could comprise comparing the first measurement C1 as supplied by the first sensor 15.1 with the second measurement C2 as supplied by the second sensor 15.2, and analyzing variation in the first measurement C1 and in the second measurement C2 as a function of the depression of the brake pedal 14.

Furthermore, the electronic control unit 13.1 is advantageously arranged to perform a servo control loop for delivering the first control signal S1 and the second control signal S2 in compliance with a control relationship that is a function both of the depression of the brake pedal 14 and also of the first braking torque measurement C1 as supplied by the first sensor 15.1 and/or of the second braking torque measurement C2 as supplied by the second sensor 15.2.

Thus, the control system is arranged to convert the depression value of the brake pedal into a braking torque setpoint that is used by the electronic control unit 13.1 in order to create a signal S1 and a signal S2. The measurement of the braking torque serves both to modify the braking torque setpoint so as to deliver braking torque that corresponds to the depression value of the brake pedal and also to apply torque limiting by ceasing to feed fluid to one of the actuators if the braking torque measurement is greater than the predetermined threshold.

The servo control loop serves to control the braking torque applied by the brake on the wheel, and for example to ensure that the energy that is dissipated during braking is distributed better among the various wheels R provided with brakes of the braking device 10.

It should be observed that the control system 13 may be in the form of a computer processor unit conventionally comprising at least one processor and a memory containing both a control program and a monitoring program that are executed by the processor in order to execute the functions specified above. Alternatively, an the control system 13 may comprise two independent electric circuits, each with its own calculation and memory means, namely one electronic circuit arranged to form the control unit and another electronic circuit arranged to form the monitoring unit.

FIG. 3 shows a braking device 20 in a second embodiment of the invention.

As above, the braking device 20 has a brake with a first actuator 21.1 and a second actuator 21.2 arranged to apply a braking torque to the wheel R. The first actuator 21.1 is connected to an output of a first hydraulic servovalve 22.1 and the second actuator 21.2 is connected to an output of a second hydraulic servovalve 22.2. The first and second servovalves 22.1 and 22.2 are connected to a control system 23 arranged to deliver a first control signal S11 to said first servovalve 22.1 and a second control signal S12 to said second servovalve 22.2. The signals S11 and S12 are representative of depression of a brake pedal 24. The control system 23 is also connected to a first braking torque sensor 25.1 that is arranged on the brake so as to supply the control system 23 with a first measurement C11 of the braking torque applied by the brake on the wheel R.

The braking device 20 differs from the braking device 10 in that the control system 23 comprises both a first electronic control unit 23.1 arranged to deliver the first control signal S11 and a second electronic control unit 23.2 arranged to deliver the second control signal S12.

In the event of the first measurement C11 of the braking torque supplied by the first sensor 25.1 exceeding the predetermined braking torque limit value, the first electronic control unit 23.1 and the second electronic control unit 23.2 can act respectively to interrupt the delivery of the first control signal S11 and of the second control signal S12.

Thus, the control system 23 serves to interrupt control of the first actuator 11.1 or of the second actuator 11.2, and thus to provide protection against any excess torque as might be due to a failure of the first electronic control unit 23.1 or of the second electronic control unit 23.2. Each electronic control unit 23.1 or 23.2 can release the force produced by the actuator 11.1 or 11.2 under its control very quickly in the event of excess torque, e.g. resulting from a failure of the other control unit 23.2 or 23.1, thereby limiting the excess torque exerted by the braking system as a whole.

In similar manner to the braking device 10, the device 20 may optionally include a second braking torque sensor 25.2 arranged on the brake to supply the control system 23 with a second measurement C12 of the braking torque applied by the brake on the wheel R.

Likewise, the first and second electronic control units 23.1 and 23.2 may optionally include respective servo control loops for delivering the first and second control signals S11 and S12 as a function both of the depression of the brake pedal 24 and also of the measurement of the braking torque. The implementation of servo control on two values is the same as in the first embodiment, as are its advantages.

Naturally, the invention is not limited to the embodiments described, but covers any variant coming within the ambit of the invention as defined by the claims.

Although in this example the first actuators 11.1, 21.1 and the second actuators 11.2, 21.2 are hydraulic, they could be electromechanical. It is then preferable to provide a control unit that is connected to two power units, each connected to a respective one of the actuators.

The first actuators 11.1, 21.1 and the second actuators 11.2, 21.2 may be of different types.

The first actuators 11.1, 21.1 and the second actuators 11.2, 21.2 need not necessarily the equivalent capacity.

The number actuators may be greater than two.

The number of braking torque sensors may be greater than two.

Although the two embodiments that are described above are described independently of each other, they could be combined.

Although in this example the braking device is described with reference to an aircraft wheel, it could also apply to a braked wheel of a car, and more generally to a braked wheel of a vehicle.

The braking setpoint may be derived from depressing a brake pedal, or indeed from activating any other control member, or indeed from a computer. Thus, the braking setpoint may be the result of the pilot selecting an "autobrake" braking mode that guarantees constant deceleration of the aircraft.

The invention claimed is:

1. A braking device for braking a wheel, the braking device comprising:
   a brake including at least a first actuator and a second actuator arranged to apply a braking torque to the wheel;
   a control system arranged to control the first and second actuators individually as a function of a braking value; and
   a first torque sensor arranged to supply the control system with a first measurement representative of the braking torque applied to the wheel by the brake,
   wherein the control system is configured to interrupt control of the first actuator or control of the second actuator in the event of the first measurement exceeding a braking torque limit.

2. The braking device according to claim 1, wherein the control system comprises an electronic control unit configured to deliver a first control signal to the first actuator and a second control signal to the second actuator, and an electronic monitoring unit configured to prevent the first control signal or the second control signal from being delivered when the first measurement exceeds the braking torque limit.

3. The braking device according to claim 1, wherein the control system comprises a first individual electronic control unit configured to deliver a first control signal to the first actuator and a second individual electronic control unit arranged to deliver a second control signal to the second actuator.

4. The braking device according to claim 1, wherein the control system includes a servo control loop that controls the first actuator and the second actuator in application of a control relationship that is a function both of the braking value and also of the first measurement.

5. The braking device according to claim 1, wherein the braking value is representative of an amplitude of a movement of a braking control instrument.

6. The braking device according to claim 1, wherein the first actuator and the second actuator are electromechanical.

7. The braking device according to claim 1, wherein the first actuator and the second actuator are hydraulic actuators.

8. The braking device according to claim 1, including a second torque sensor configured to supply the control system with a second measurement of the braking torque applied by the brake to the wheel.

9. The braking device according to claim 8, wherein the first torque sensor and the second torque sensor are of different technologies.

10. A landing gear including at least one wheel provided with a braking device according to claim 1.

11. An aircraft including a landing gear according to claim 10.

12. A braking device for braking a wheel, the braking device comprising:
- a brake including at least a first actuator and a second actuator arranged to apply a braking torque to the wheel;
- a control system arranged to control the first and second actuators individually as a function of a required braking value; and
- at least a first torque sensor arranged to supply the control system with a first measurement representative of the braking torque applied to the wheel by the brake, wherein the control system interrupts control of the first actuator or control of the second actuator in the event of the first measurement exceeding a predetermined braking torque limit.

13. A method for braking a wheel equipped with a braking device comprising:
- a brake including at least a first actuator and a second actuator arranged to apply a braking torque to the wheel;
- a control system arranged to control the first and second actuators individually as a function of a required braking value; and
- at least a first torque sensor arranged to supply the control system with a first measurement representative of the braking torque applied to the wheel by the brake;
- the method comprising interrupting control of the first actuator or control of the second actuator by the control system in the event of the first measurement exceeding a predetermined braking torque limit.

* * * * *